UNITED STATES PATENT OFFICE.

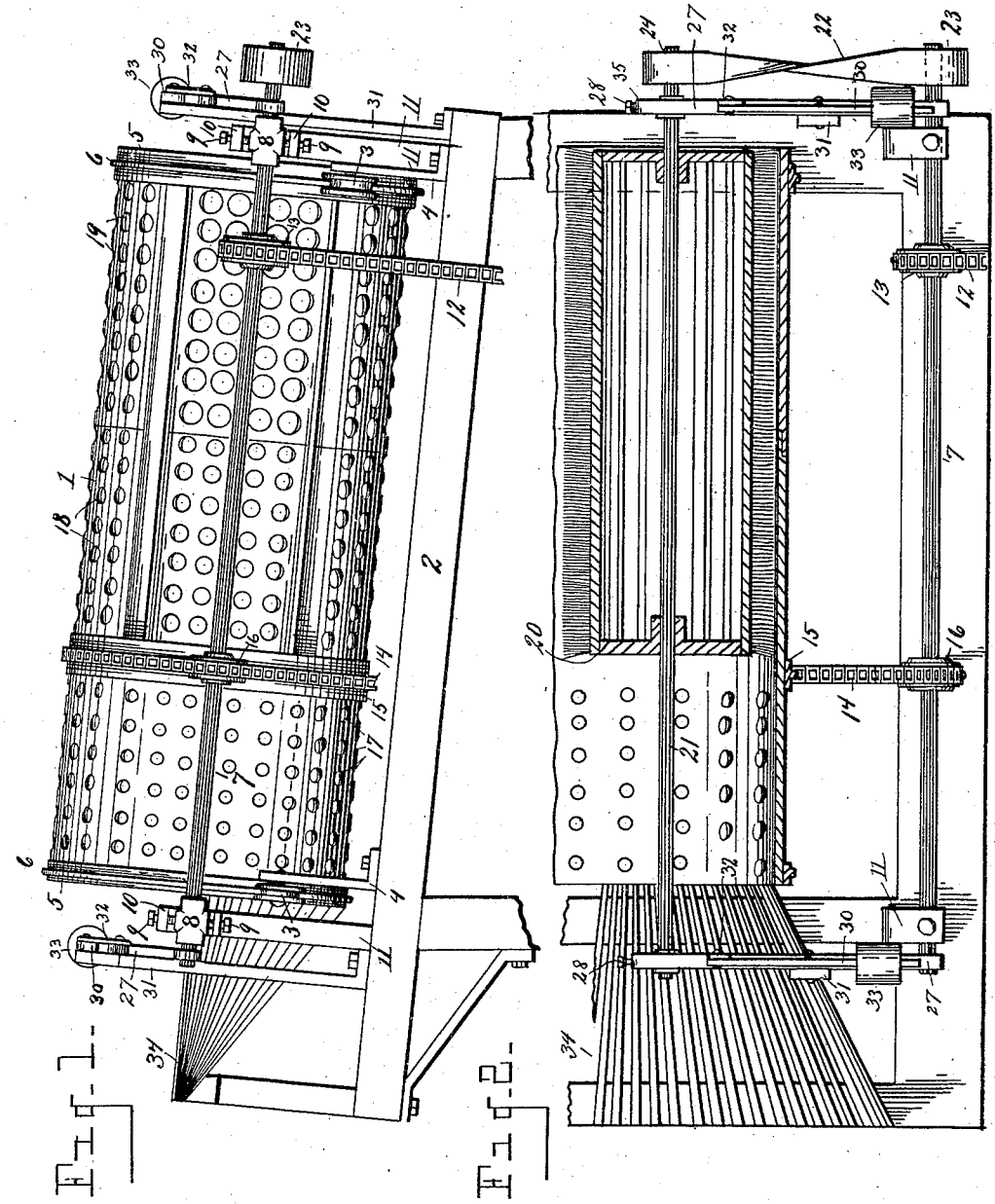

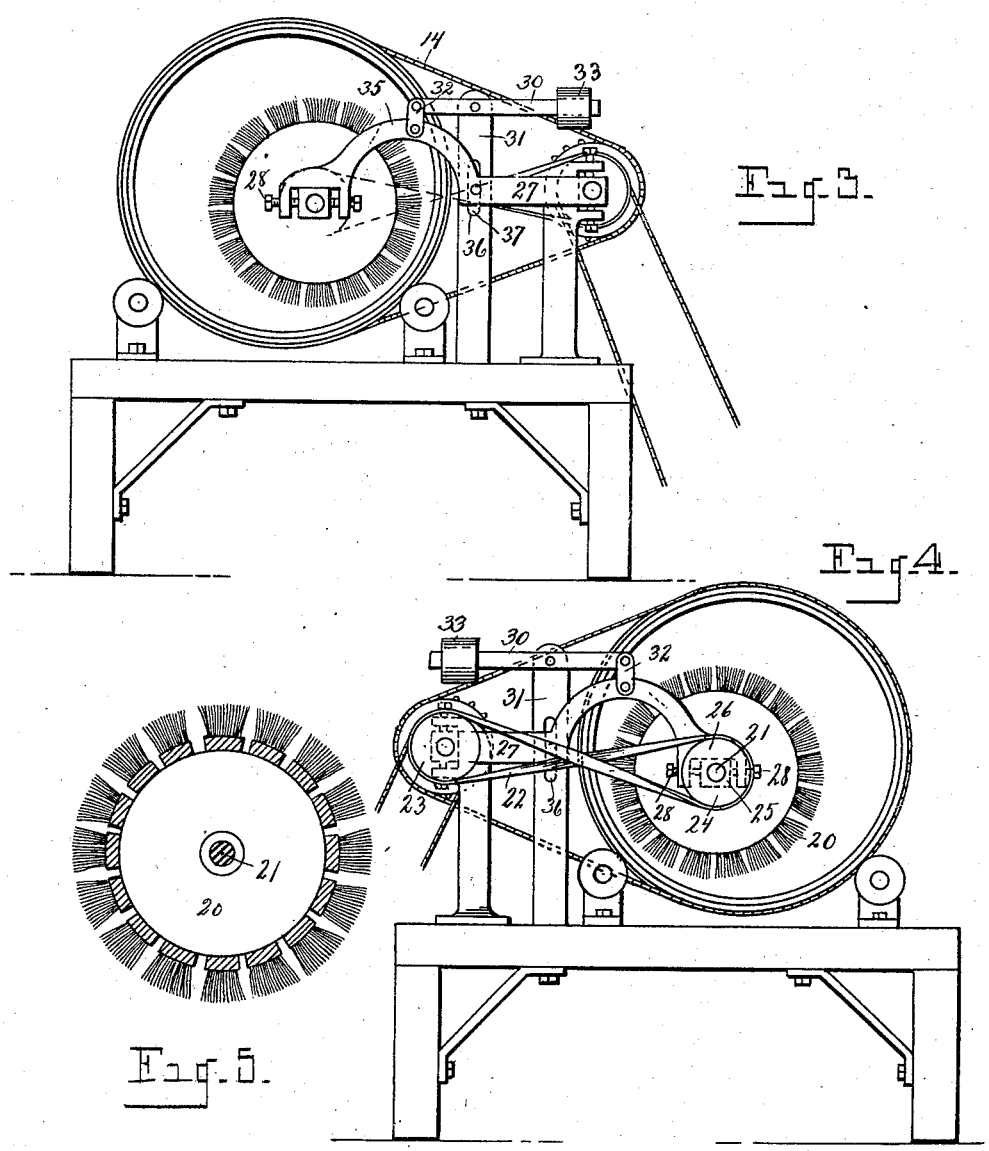

J. P. CONLEE, OF SHERIDAN, MICHIGAN.

POTATO GRADER AND CLEANER.

SPECIFICATION forming part of Letters Patent No. 687,495, dated November 26, 1901.

Application filed September 15, 1900. Serial No. 30,102. (No model.)

*To all whom it may concern:*

Be it known that I, J. P. CONLEE, a citizen of the United States, residing at Sheridan, in the county of Montcalm, State of Michigan, have invented certain new and useful Improvements in Potato Graders and Cleaners; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a power-machine for grading and cleaning potatoes and other vegetables; and it consists in the construction and arrangement of parts hereinafter more fully set forth and pointed out particularly in the claims.

The object of the invention is to provide simple an efficient means for removing dirt and sprouts from the vegetables, for grading and separating them into divisions of different sizes for the particular market to which they are to be shipped, and for thoroughly cleaning the vegetables, so as to present them in a fine marketable condition. The above object is attained by the mechanism illustrated in the accompanying drawings, in which—

Figure 1 is a side elevation of my improved device. Fig. 2 is a central horizontal section through the perforated cylinder and rotary brush within said cylinder, parts being broken away. Fig. 3 is a front end elevation of the machine. Fig. 4 is a rear end elevation thereof. Fig. 5 is a transverse section through the rotary brush.

Referring to the characters of reference, 1 designates a rotary cylinder of suitable length and diameter and composed of sheet-metal sections united by overlapping joints. Said cylinder is mounted upon a supporting-frame 2, which is inclined to maintain the ingress end of said cylinder higher than the egress end thereof. The cylinder is supported to rotate upon grooved rollers 3, located at opposite ends thereof and journaled to the saddles 4, which are mounted upon the frame and which support said rollers, so as to engage the under arc of the cylinder on opposite sides. Each end of the cylinder is encircled by a metallic ring 5, having a circumferential flange 6, which engages in the groove of the rollers 3 and maintains the cylinder in position. The cylinder is driven through the medium of a shaft 7, extending longitudinally thereof, which is journaled at its opposite ends in bearing-boxes 8, which are adjustably supported between the screws 9, passing through the brackets 10, mounted upon the uprights 11, whereby said shaft may be adjusted to bring it into proper relation with the cylinder and its driving-chain. The shaft 7 is rotated through the medium of a sprocket-chain 12, communicating with any suitable source of power (not shown) and passing around a sprocket-wheel 13 on said shaft. Motion is imparted to the cylinder from the shaft 7 by means of a sprocket-chain 14, which engages the sprocket-teeth of the ring 15, surrounding said cylinder, and passes around the sprocket-wheel 16 on said shaft, the great difference in the diameter of the ring and sprocket-wheel being calculated to revolve the cylinder slowly.

Beginning with the upper end of the cylinder it will be seen that the perforations 17 in the wall of the first section thereof are comparatively small, that the perforations 18 in the second section are somewhat larger, and that the perforations 19 in the third and last section are still larger. The object of the several sizes of perforations is to grade and separate the potatoes and vegetables passing through the cylinder. The perforations 17 in the first section of the cylinder are calculated to allow of the passage of dirt and small worthless potatoes from the cylinder. The second larger perforations 18 are calculated to discharge from the cylinder a grade of small potatoes desirable for some markets. The third series of perforations 19 are calculated to discharge a still larger grade, while the potatoes and vegetables too large to pass through any of the perforations of the cylinder are discharged from the rear end thereof, making three separations and three grades of marketable stock For the purpose of thoroughly cleaning the potatoes and vegetables and removing all adhering dirt and sprouts therefrom a rotary brush 20 is employed within the cylinder.

Said brush extends longitudinally of the interior of the cylinder and is mounted upon a shaft 21, which passes entirely through the cylinder and projects from the ends thereof. The shaft of the brush is driven through the medium of a crossed belt 22, leading from the pulley 23 on the shaft 7 and passing around a pulley 24 on the brush-shaft, whereby the brush is caused to revolve in a direction opposite to that of the cylinder. On referring to Figs. 3 and 4 it will be seen that the brush is suspended eccentrically within the cylinder and that its periphery is nearest the wall of the cylinder at a point slightly above the lower arc thereof, so that the potatoes which are carried upward by the rotation of the cylinder onto the side thereof are brought into contact with the brush, which as the potatoes are rolled over and over by the motion of the cylinder sweeps into contact with the surfaces thereof, thoroughly removing all dirt therefrom.

The ends of the brush-shaft are journaled in movable boxes 25, loosely mounted in a way in the heads 26 of the pivoted arms 27 and supported by adjusting-screws 28, whereby said boxes may be adjusted laterally. The arms 27 are located at opposite ends of the cylinder and are pivoted to the projecting ends of the driving-shaft 7, whereby the free or inner ends of said arms in which the ends of the brush-shaft are journaled are adapted to swing in the arc of a circle. To support the brush in proper position within the cylinder, a weighted lever 30, pivoted to an upright 31, is attached to each of said arms by means of a connecting-link 32. The weight 33 upon each of said levers 30 may be moved thereon to increase or decrease the pressure with which the brush bears upon the vegetables within the cylinder, whereby said pressure may be regulated according to the condition of the stock. For the purpose of varying the distance between the periphery of the brush and the inner wall of the cylinder the boxes 25, supporting the ends of the brush-shaft, are made to move laterally by means of the adjusting-screws 28, whereby the distance between the inner wall of the cylinder and the brush may be regulated according to the requirements.

The stock is directed into the upper end of the cylinder through the medium of a hopper composed of radial bars 34, which extend downwardly and converge toward the opening in the ingress end of the cylinder, with which the discharge end of the hopper is made to conform. The sides of the hopper stand on a horizontal plane with the central transverse diameter of the cylinder, so that the stock will not be carried over the side of the hopper as the cylinder rotates. The open bars of the hopper allow of the passage of dirt and refuse matter. The curve 35 in the pivoted arm 27 at the upper end of the cylinder is to allow of the operation of said arm without contact with the side of the hopper. The vertical standards 31 are provided with slots 36, in which a pin 37, carried by the arms 27, is adapted to play, whereby the arms are steadied in their movement.

The component sections of the cylinder are made removable, so that, if desired, the perforated sections of the cylinder may be changed for the purpose of varying the size of the aperture in the wall of the cylinder.

With this improved machine the stock may be fed rapidly therethrough, enabling a large quantity to be handled within a comparatively short time and in such manner as to grade and clean the stock, so that after passing through the machine it is in first-class condition for the market.

Having thus fully set forth my invention, what I claim as new, and desire to secure by Letters Patent, is—

1. In a machine for the purpose set forth, the combination of a rotary inclined cylinder having perforations therethrough, a rotary brush extending longitudinally of the interior of the cylinder, a shaft upon which said brush is mounted having its ends projecting from the ends of said cylinder, means for rotating said cylinder and brush, pivoted arms supporting the projecting ends of the shaft of said brush, movable boxes in said arms which receive the ends of the brush-shaft, said boxes being adjustable transversely of the cylinder, and a counterpoise for supporting said arms.

2. In a machine for the purpose set forth, the combination of the inclined perforated cylinder adapted to rotate upon a peripheral support, a rotary brush within said cylinder extending longitudinally thereof and eccentric thereto, pivoted arms supporting the ends of the brush-shaft beyond the ends of the cylinder, weighted levers pivoted on the frame and jointedly attached to said arms to suspend the brush eccentrically within the cylinder and means for rotating said brush.

3. In a machine for the purpose set forth, the combination of the rotary cylinder having perforations, a rotary brush within the cylinder extending longitudinally thereof, a shaft carrying said rotary brush projecting through the ends of the cylinder, pivoted arms in which the ends of said shaft are adjustably journaled and weighted levers pivoted on the frame and attached to the pivoted arms.

In testimony whereof I sign this specification in the presence of two witnesses.

J. P. CONLEE.

Witnesses:
  A. N. RUSSELL,
  E. FOLLETT.